United States Patent
Tally et al.

(10) Patent No.: US 9,887,523 B2
(45) Date of Patent: Feb. 6, 2018

(54) LADDER-TYPE CABLE TRAY

(71) Applicant: Cooper Technologies Company, Houston, TX (US)

(72) Inventors: Brandon Michael Tally, Greenville, IL (US); Stephen Nathaniel Thompson, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 695 days.

(21) Appl. No.: 14/226,322

(22) Filed: Mar. 26, 2014

(65) Prior Publication Data

US 2016/0204586 A1 Jul. 14, 2016

(51) Int. Cl.
*H02G 3/04* (2006.01)
*B21J 15/04* (2006.01)
*F16L 3/26* (2006.01)
*B21J 15/02* (2006.01)

(52) U.S. Cl.
CPC ............ *H02G 3/0456* (2013.01); *B21J 15/02* (2013.01); *B21J 15/04* (2013.01); *F16L 3/26* (2013.01); *H02G 3/0468* (2013.01)

(58) Field of Classification Search
USPC ........ 248/49, 58, 61; 174/68.1, 68.3, 95, 97, 174/99 R; 182/228.1, 228.6
See application file for complete search history.

(56) References Cited

U.S. PATENT DOCUMENTS

| | | | |
|---|---|---|---|
| 2,656,998 A | 10/1953 | Ullberg, Jr. | |
| 2,905,416 A | 9/1959 | Wiegand | |
| 3,521,843 A | 7/1970 | Ogle | |
| 3,566,991 A | 3/1971 | Proulx | |
| 3,680,817 A | 8/1972 | Gogan | |
| 3,938,767 A | 2/1976 | Norris | |
| 3,949,836 A * | 4/1976 | Russo | E06C 7/086 182/194 |
| 4,046,343 A | 9/1977 | Kambara | |
| 4,232,845 A | 11/1980 | Turner | |

(Continued)

FOREIGN PATENT DOCUMENTS

| | | | |
|---|---|---|---|
| CA | 2137879 | 3/1999 | |
| FR | 2588426 A1 * | 4/1987 | F16L 3/26 |

(Continued)

*Primary Examiner* — Alfred J Wujciak
(74) *Attorney, Agent, or Firm* — Senniger Powers LLP (57) ABSTRACT

A cable tray includes a plurality of fasteners fastening rungs to side rails. Each fastener may be a radially expandable fastener having a radially expandable portion received in one of the fastener openings of one of the rungs. Each radially expandable portion is in an expanded configuration and frictionally engages the corresponding rung inside the corresponding fastener opening to inhibit withdrawal of the radially expandable fastener from the fastener opening. Each fastener opening may be defined by an interior surface of the corresponding rung and at least one projection extending radially inward from the interior surface relative to the fastener opening. The fastener may have an engagement portion frictionally engaging the corresponding at least one projection inside the corresponding fastener opening to inhibit withdrawal of the radially expandable fastener from the corresponding fastener opening.

13 Claims, 10 Drawing Sheets

(56) References Cited

U.S. PATENT DOCUMENTS

| | | |
|---|---|---|
| 4,372,510 A | 2/1983 | Skypala |
| 4,432,519 A | 2/1984 | Wright |
| D292,974 S | 12/1987 | Kenning et al. |
| 4,802,643 A | 2/1989 | Uys |
| 5,100,086 A | 3/1992 | Rinderer |
| 5,242,137 A | 9/1993 | Yang |
| D361,982 S | 9/1995 | Rinderer |
| 5,580,014 A * | 12/1996 | Rinderer .............. H02G 3/0456 174/68.1 |

FOREIGN PATENT DOCUMENTS

| | | |
|---|---|---|
| GB | 1323088 | 7/1973 |
| GB | 2038441 A | 7/1980 |
| GB | 2065211 A | 6/1981 |
| GB | 2118237 A | 10/1983 |
| GB | 2285343 A | 5/1995 |

* cited by examiner

LADDER-TYPE CABLE TRAY

FIELD OF THE DISCLOSURE

This disclosure relates generally to support systems used in the construction industry, and more particularly to a ladder-type cable tray used to support runs of cable, electrical wiring and the like.

BACKGROUND OF THE DISCLOSURE

Conventional ladder-type cable tray comprises a pair of parallel side rails and a series of spaced-apart rungs extending between the rails, the rails and rungs typically being of extruded aluminum (although they may also be steel parts). It has been the conventional practice in the industry to secure the rungs to the rails by welding or screws.

SUMMARY OF THE DISCLOSURE

In one aspect, a cable tray generally comprises a pair of generally parallel spaced-apart side rails. Rungs extend between the rails at intervals spaced along the rails. Each metal rung has opposite ends generally abutting respective side rails, and a pair of fastener openings extending inward from opposite ends of the rung lengthwise of the rung. A plurality of radially expandable fasteners fasten the rungs to the side rails. Each radially expandable fastener has a radially expandable portion received in one of the fastener openings of one of the rungs. Each radially expandable portion is in an expanded configuration and frictionally engages the corresponding rung inside the corresponding fastener opening to inhibit withdrawal of the radially expandable fastener from the fastener opening.

In another aspect, a cable tray generally comprises a pair of generally parallel spaced-apart side rails. Rungs extends between the rails at intervals spaced along the rails. Each metal rung has opposite ends generally abutting respective side rails, and a pair of fastener openings extending inward from opposite ends of the rung lengthwise of the rung. Each fastener opening is defined by an interior surface of the corresponding rung and at least one projection extending radially inward from the interior surface relative to the fastener opening. A plurality fasteners fasten the rungs to the side rails. Each fastener has an engagement portion received in one of the fastener openings. Each engagement portion frictionally engages the corresponding at least one projection inside the corresponding fastener opening to inhibit withdrawal of the radially expandable fastener from the corresponding fastener opening.

In yet another aspect, a method of assembling a cable tray generally comprises providing a first side rail, and providing a rung having first and second fastener openings extending inwardly from opposite, corresponding first and second ends of the rung lengthwise of the rung. A fastener is inserted through the first side rail and into the first fastener opening of the rung such that a radially expandable portion of the fastener is positioned in the first fastener opening. The radially expandable portion of the fastener is radially expanded after inserting the fastener, such that the radially expandable portion frictionally engages the rung inside the first fastener opening to inhibit withdrawal of the fastener from the first fastener opening.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
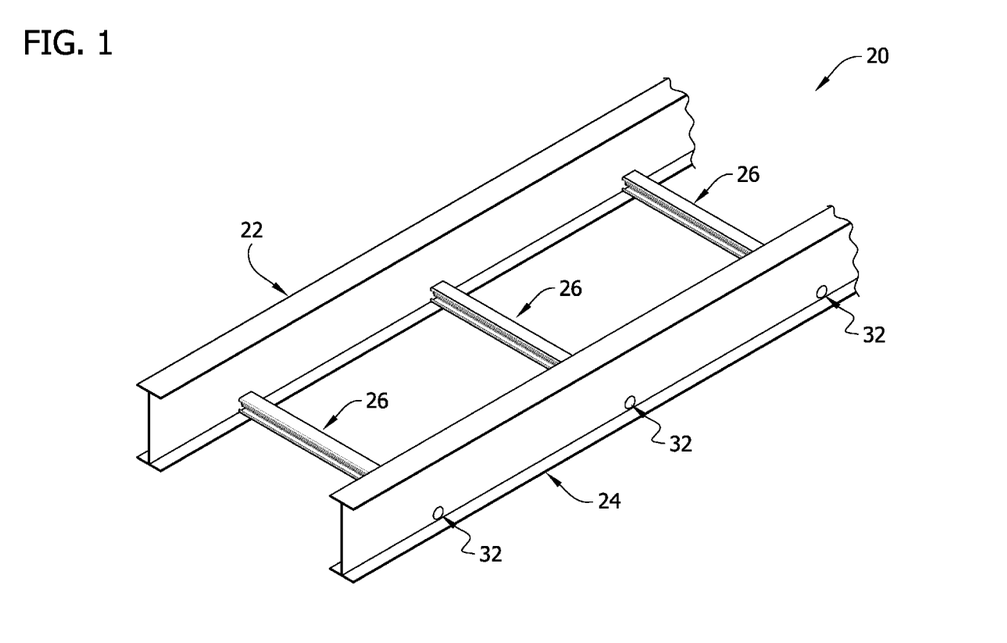
FIG. 1 is a perspective view of a ladder-type cable tray including a plurality of rungs secured to spaced apart rails by a plurality of rung fasteners.
Figure 3:
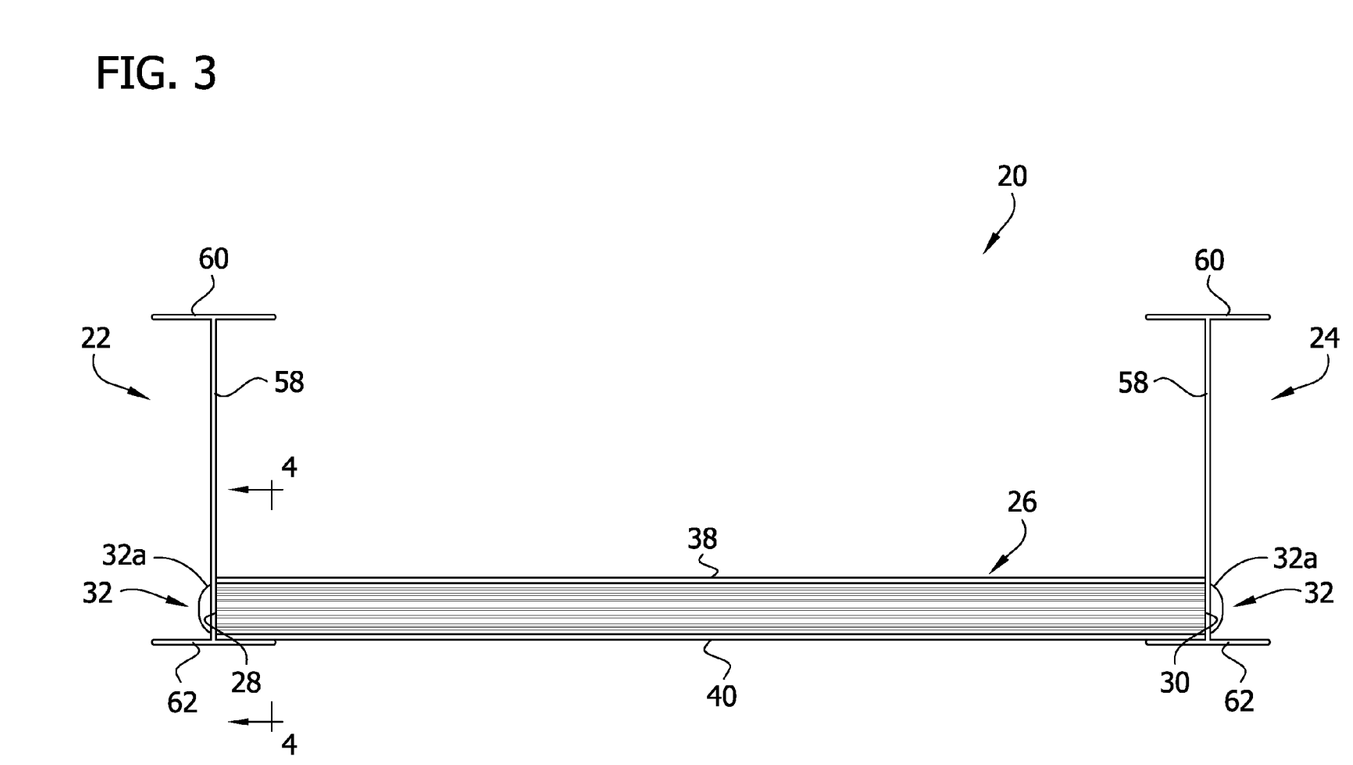
FIG. 3 is an end elevational view of the cable tray of FIG. 1.

Referring now to the drawings, and first more particularly to FIGS. 1 and 3, a ladder-type cable tray of the present disclosure is indicated in its entirety by the reference numeral 20. The cable tray 20 comprises first and second generally parallel spaced-apart metal side rails, generally designated 22, 24, and a plurality of metal rungs, each generally designated 26, extending between the rails at intervals spaced along the rails. Each rung 26 has first and second opposite ends 28, 30 abutting the first and second side rails 22, 24, respectively. As explained below, mechanical rung fasteners, generally designated 32 (e.g., rivets), extend through the side rails 22, 24 and into the opposite ends 28, 30 of the rungs 26 to fasten the rungs to the side rails. In one embodiment, radially expandable fasteners 32 (e.g., blind rivets are used to fasten the rungs 26 to the side rails 22, 24.

In one exemplary use, the cable tray 20 may be supported by a series of support bars (not shown) suspended at intervals spaced lengthwise of the cable tray, with the support bars extending generally crosswise relative to the rails. Hold-down members (not shown) may be provided for securing the rails 22, 24 to the support bars. The support bars and hold-down members are similar to those described in U.S. Pat. No. 5,100,086 (incorporated herein by reference in its entirety). It is understood that in use the cable tray 20 may be supported in other ways.

Figure 4:
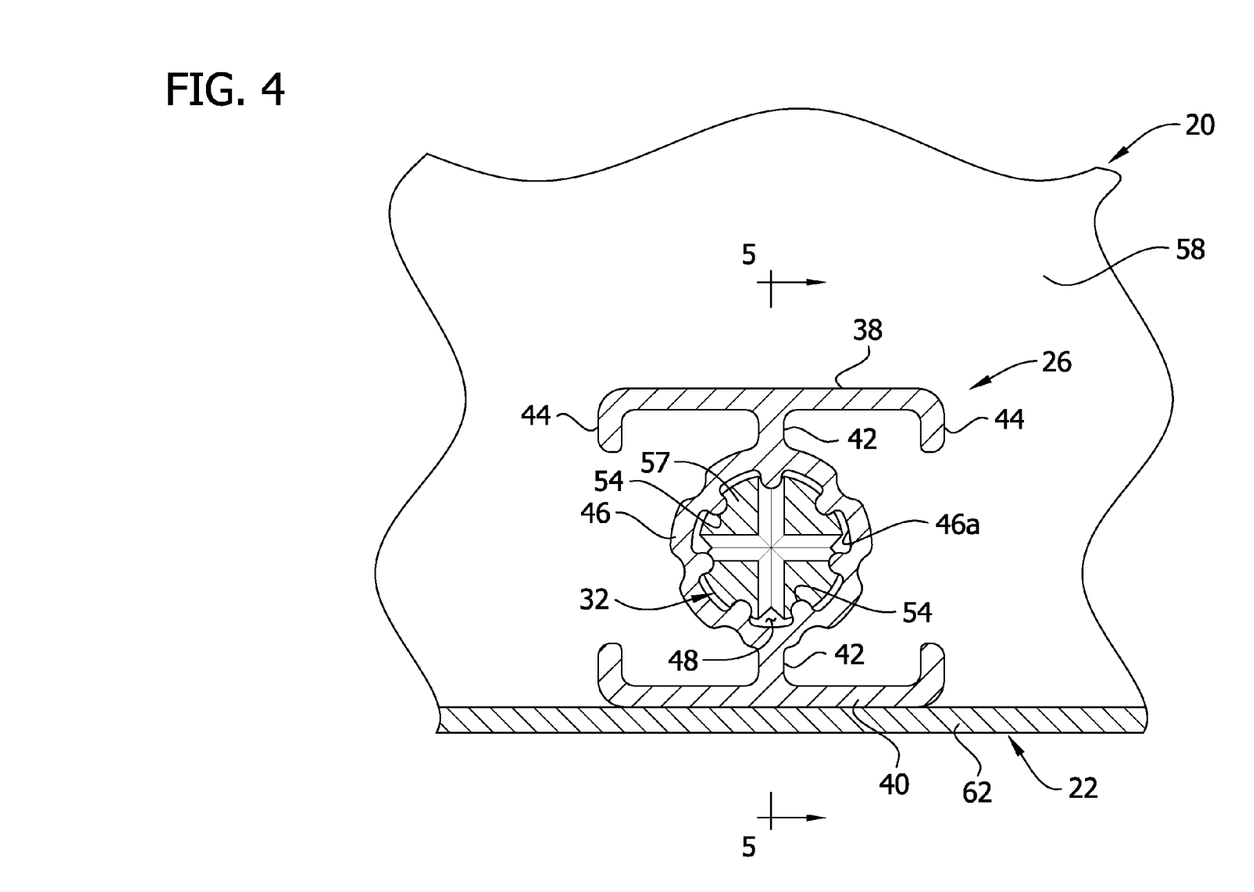
FIG. 4 is an enlarged sectional view taken along the plane of line 4-4 of FIG. 3.
Figure 6:
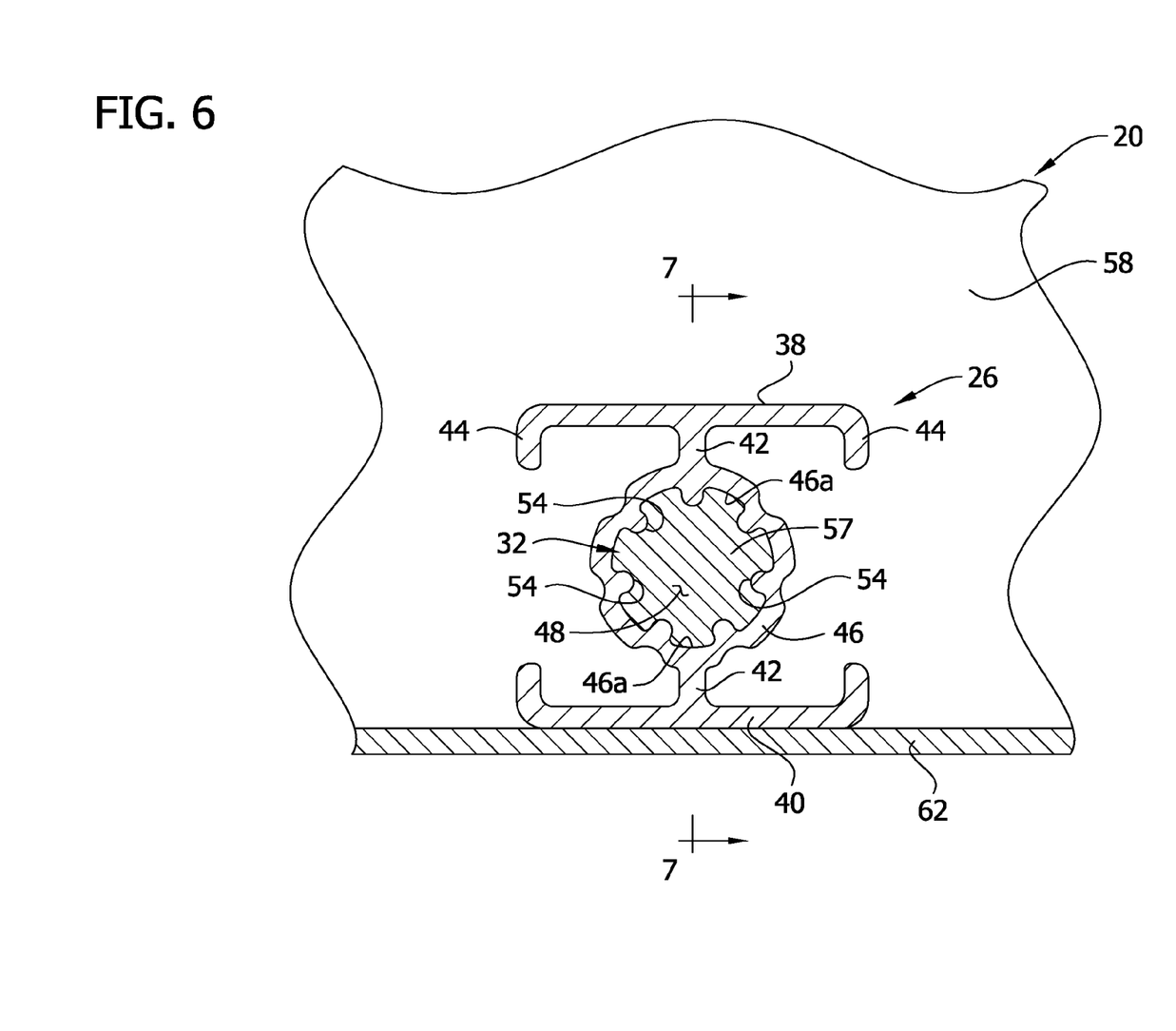
FIG. 6 is an enlarged sectional view similar to FIG. 4, except including a rung fastener of FIG. 10.
Figure 8:
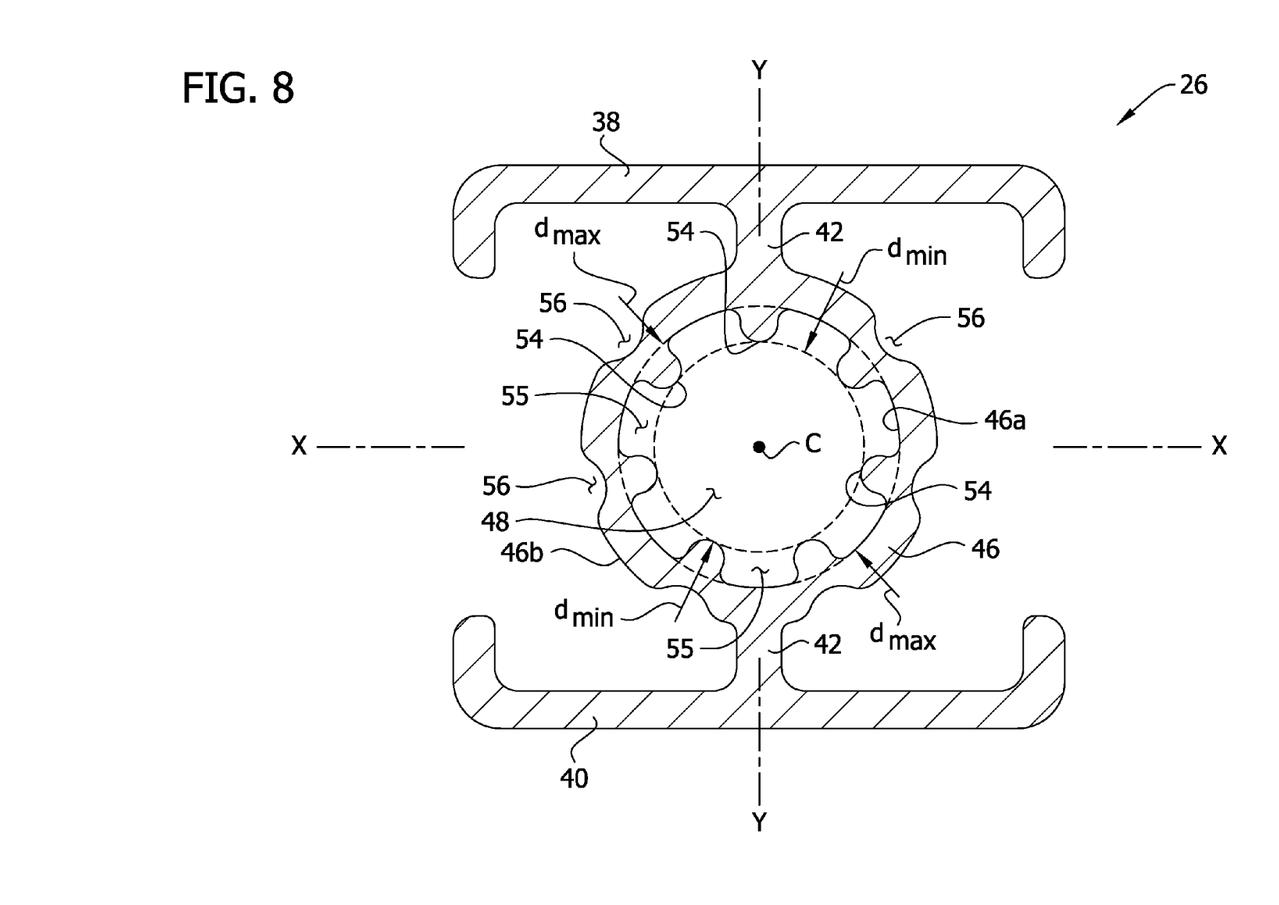
FIG. 8 is a cross section of the rung of the cable tray of FIG. 1.

As shown best in FIGS. 4, 6 and 8, each rung 26 has generally horizontal upper and lower flanges 38, 40 and a generally vertical web 42 connecting the two flanges. In one exemplary use, electrical cable and wire may be placed in the cable tray 20 such that the cable and wire rest on the upper flanges 38 of the rungs. In the illustrated embodiment, each upper flange 38 has a smooth top surface with edge margins 44 which curve downwardly to avoid snagging or damage to the electrical cable and wire. The edge margins 44 also have rounded edges to avoid slicing or snagging the electrical cable and wire. The web 42 of the rung 26 lies in a central longitudinal vertical plane (designated in FIG. 8 by the line Y-Y) of the rung and the rung is symmetrical about this plane. The rung 26 is also symmetrical about a central longitudinal horizontal plane (designated in FIG. 8 by the line X-X) passing through the rung midway between the upper and lower flanges 38, 40. Because of its symmetry, the rung is reversible; in other words, the upper flange 38 of the rung is identical to the lower flange 40, and the first end 28 of the rung is identical to the second end 30. For ease of manufacture, each rung 26 has a uniform cross section throughout its entire length. It is understood that the rungs 26 may be of other configurations without departing from the scope of the claimed invention.

Referring to FIG. 8, a generally rigid tubular rung structure 46 is formed as an integral part of the web 42 of the rung 26 and extends continuously from one end 28 of the rung to the other end 30 of the rung. The rung structure 46 has first and second preformed fastener openings 48 (FIG. 8; only one opening is visible in the drawings) extending inwardly from the opposite ends 28, 30 of the rung lengthwise of the rung. As shown in FIGS. 4-7, each fastener opening 48 receives one of the fasteners 32 for securing the rung 26 to the side rails 22, 24. In the illustrated embodiment, the first and second fastener openings 48 combine to constitute a single continuous through hole 52 (FIGS. 5 and 7) extending through the rung structure 46 from the first end 28 of the rung to the second end 30. It is understood that the fastener openings 48 may be formed as blind holes or bores that do not form the continuous through opening 52. As shown in FIGS. 4, 6 and 8, the rung structure 46 extends completely around the perimeter (circumference) of the fastener openings 48 so that the perimeter of each fastener opening is totally enclosed by the rung structure to provide a strong connection between the rung structure and the fasteners 32. In one example, the wall thickness of the tubular rung structure 46 is sufficient (e.g., ⅛ in.) to inhibit significant radial deformation of the structure during expansion of the radially expandable fasteners 32 in the fastener openings 48. Each rung 26 may be constructed from aluminum and may be formed by extrusion or other suitable method. Each rung 26 may be I-shaped in transverse cross section. However, it is to be understood that, alternatively, the rung may be C-shaped, Z-shaped, or rectangular in transverse cross section, or have other suitable cross-sectional shapes.

As shown in FIGS. 4, 6, and 8, each of the first and second fastener openings 48 (or hole 52) is defined by an interior surface 46a of the tubular rung structure 46, and a plurality of internal projections or ribs 54 extending generally radially inward (e.g., generally toward a center C (FIG. 8) of the respective fastener opening) from the interior surface and running lengthwise of the tubular rung structure. As explained below, the internal projections 54 facilitate or enhance frictional engagement between the radially expandable fastener 32 (e.g., the blind rivet) and the rung structure 46 to inhibit withdrawal of the fastener from the corresponding fastener opening 48. The internal projections 54 of each fastener opening 48 are spaced apart from one another around the circumference or periphery of the interior surface 46a to define a plurality of gaps 55 between adjacent projections. As shown in FIG. 8, an exterior surface 46b of the tubular rung structure 46 has a plurality of indentations 56 radially aligned with the internal projections 54 to inhibit radial expansion and deformation of the rung structure 46. The illustrated embodiment includes seven internal projections 54, although in other embodiments the rung structure 46 may include any suitable number of projections.

Figure 5:
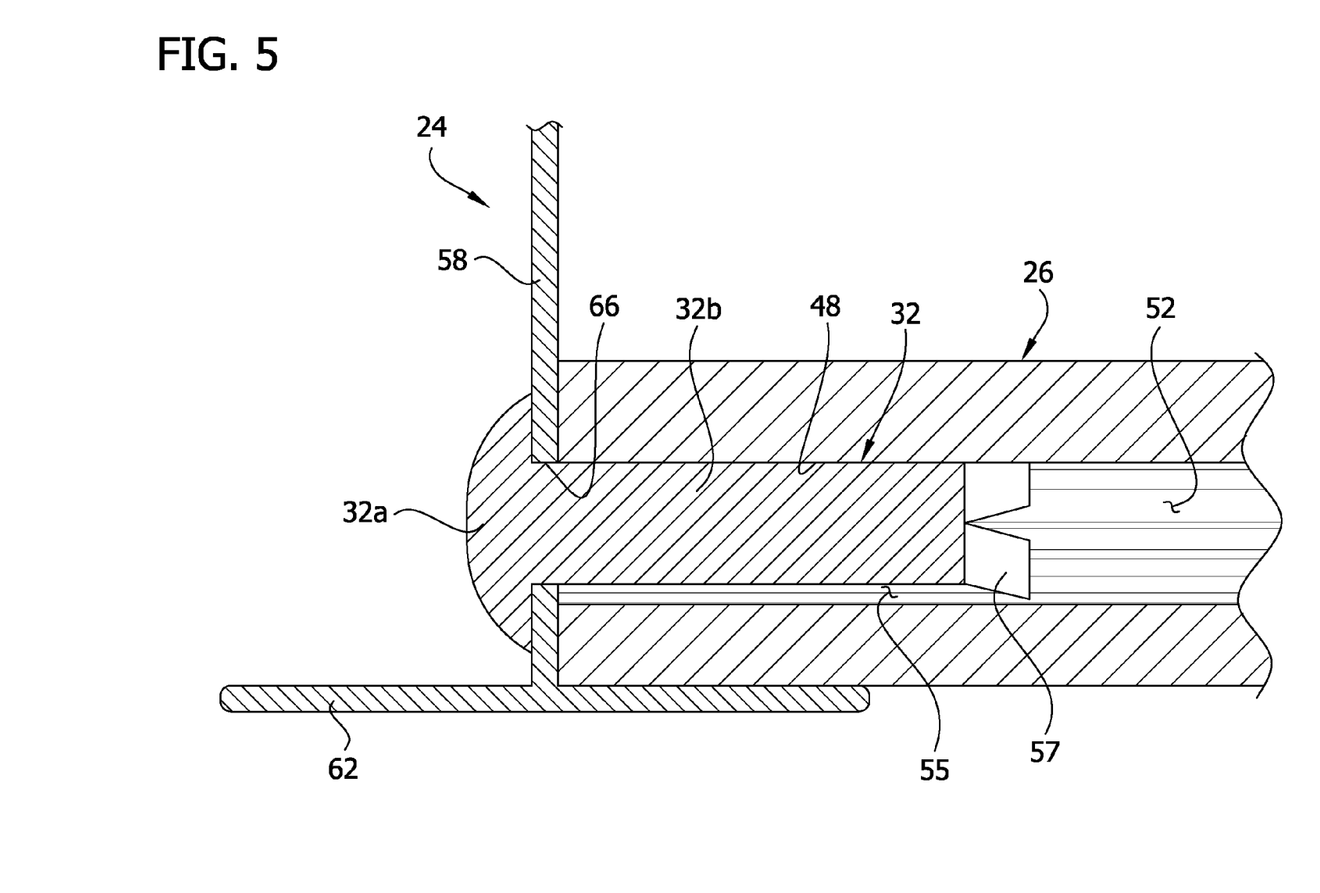
FIG. 5 is a sectional view taken along the plane of line 5-5 of FIG. 4.
Figure 7:
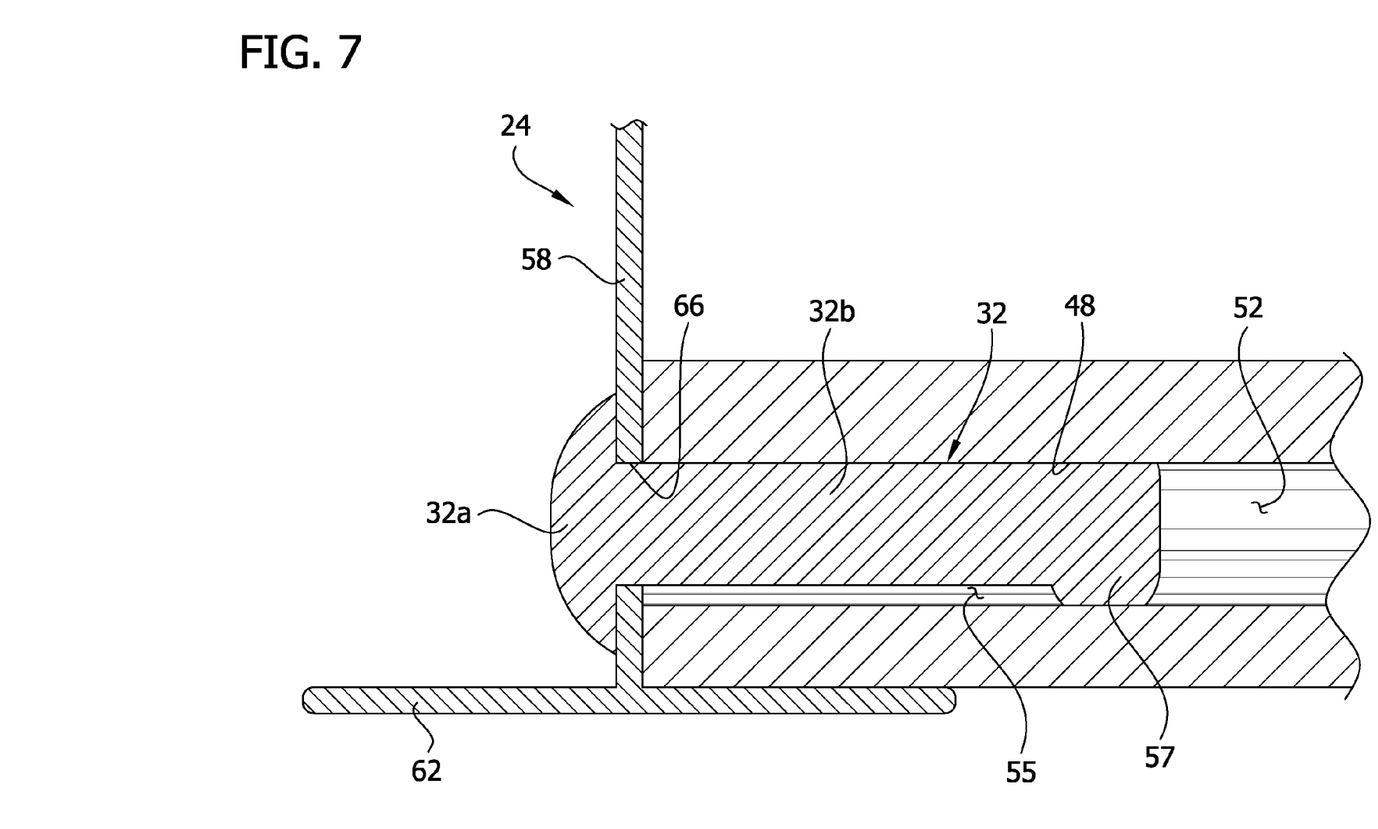
FIG. 7 is a sectional view similar to FIG. 5, except including the rung fastener of FIG. 10.
Figure 9:
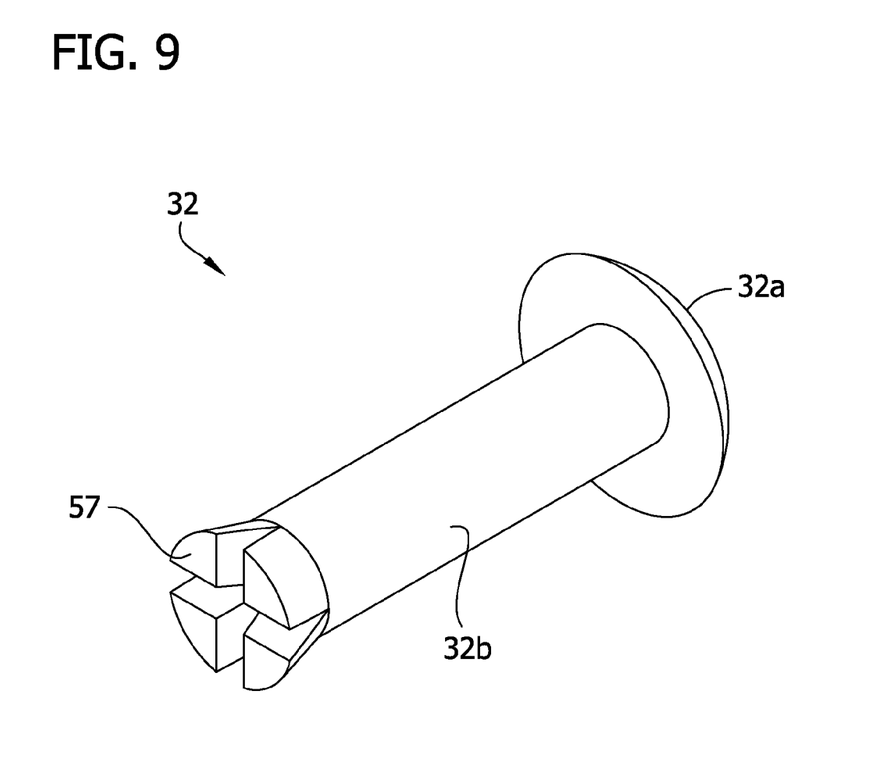
FIG. 9 is an enlarged perspective of one of the rung fasteners of the cable tray of FIGS. 1-5.
Figure 10:
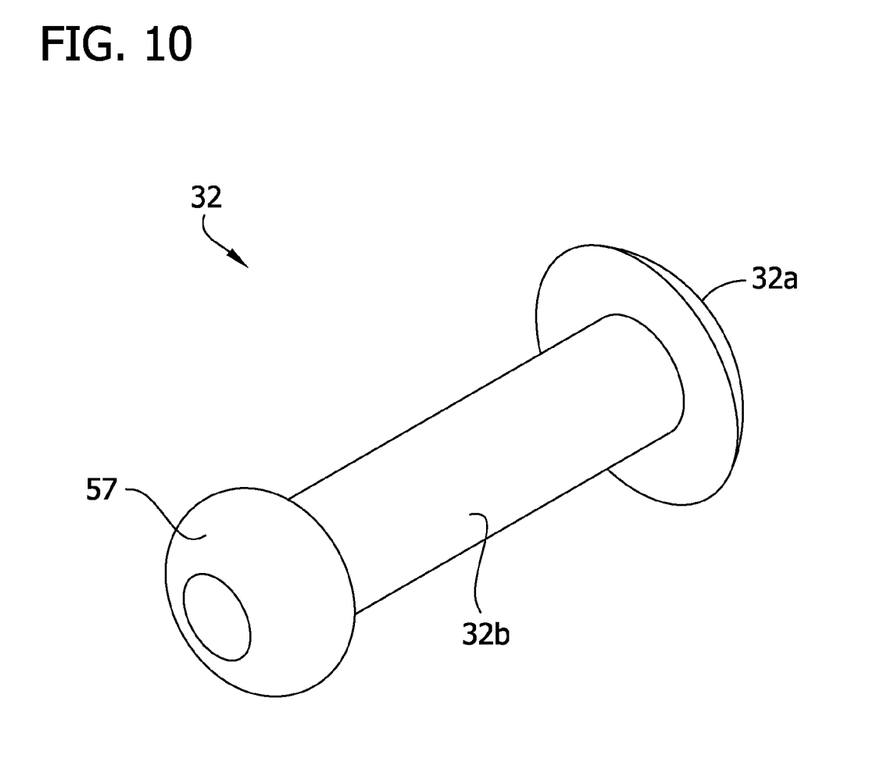
FIG. 10 is a perspective of one of the rung fasteners for the cable tray of FIGS. 6 and 7.

Examples of suitable radially expandable fasteners 32 for securing the rungs 26 to the side rails 22, 24 are shown outside the fastener openings 48 in FIGS. 9 and 10. Each of the fasteners 32 includes a head 32a, a shaft 32b extending outward from the head, and a radially expandable portion 57 (broadly, an engagement portion) on the shaft (e.g., adjacent a free end of the shaft). The radially expandable portion 57 is selectively configurable between a non-expanded configuration (not shown) having a non-expanded diameter, and an expanded configuration having an expanded diameter. The fastener 32 illustrated in FIG. 9 is generally referred to as a drive rivet, the construction and operation of which is generally known. The drive rivet 32 installed in the rung 26 is shown in FIGS. 4 and 5. The fastener 32 illustrated in FIG. 10 is generally referred to as a pop rivet, the construction and operation of which is generally known. The pop rivet installed in the rung 26 is shown in FIGS. 6 and 7. The radially expandable fasteners 32 may be of other types and configurations without departing from the broad scope of the claimed invention. For reasons which become apparent from the below description, the radially expandable portions 57 of the fasteners 32 may have an indentation hardness less than an indentation hardness of at least the projections 54 of the rung structure 46. For example, the radially expandable portions 57 may be formed from an aluminum alloy that has an indentation hardness less than the indentation hardness of the aluminum projections 54.

As shown in FIGS. 4 and 6, in one embodiment the radially expandable portion 57 of the fastener 32 engages and deforms around the internal projections 54 of the corresponding fastener opening 48 as the radially expandable portion expands within the fastener opening. As shown in FIG. 8, radial terminal ends of the projections 54 define a minimum diameter $d_{min}$ of the corresponding fastener opening 48, and the interior surface 46a defines a maximum diameter $d_{max}$ of the fastener opening. In one embodiment, the radially expandable portion 57 of the fastener 32 has a non-expanded diameter (not shown) that is less than or equal to the minimum diameter minimum diameter $d_{min}$ of the corresponding fastener opening 48, so that the shaft 32b of the fastener is readily insertable into the fastener opening. In addition, in this embodiment the radially expandable portion 57 of the fastener 32 has an expanded diameter (FIGS. 7 and 8) that is greater than the minimum diameter $d_{min}$ of the corresponding fastener opening 48 (and greater than, equal to, or less than the maximum diameter $d_{max}$ of the fastener opening), so that the radially expandable portion engages and deforms around the projections 54 and enters the gaps 55 as the radially expandable portion expands within the fastener opening due, in part, to the indentation hardness of the radially expandable portions being less than the indentation hardness of the projections. Described another way, the projections 54 may be described as biting or digging into the radially expandable portion 57 as the portion expands in the fastener opening 48. The radially expandable portion 57 may contact and exert a radially outward force against the interior surface 46a between the adjacent projections. Through this arrangement, the internal projections 54 facilitate or enhance frictional engagement between the radially expandable fastener 32 (e.g., the blind rivet) and the rung structure 46 for securing the rung 26 to the side rails 22, 24. The expanded portion 57 exerts a large radially outward force on the internal projections 54, which, in turn, imparts a radially outward force on the rung structure 46. The thickness of the rung structure 46 and the indentations 56 on the exterior surface 46b inhibit radial deformation of the rung structure, although the rung structure may deform slightly due to the radially outward force imparted by the radially expanded portions of the fasteners.

In other embodiments the internal projections 54 may have other shapes and configurations. For example, in one non-limiting example, the interior surface 46a of the rung structure 46 may be knurled or otherwise constructed with similar projections for increasing frictional engagement with the fastener 32. It is also understood that in other embodiments the fasteners 32 may be fasteners other than radially expandable fasteners. For example, the fasteners 32 may be configured as press-fit fasteners that either deform or impart deformation of the rung structure 46 when the fasteners are inserted into the fastener openings 48 to form a tight, frictional interference fit within the fastener openings. In yet other embodiments, the rung structure 46 may be free from internal projections 54. For example, in a non-limiting example, the interior surface 46a may be generally smooth. In this example, a radially expandable fastener may include projections that engage the interior surface 46a.

Figure 2:
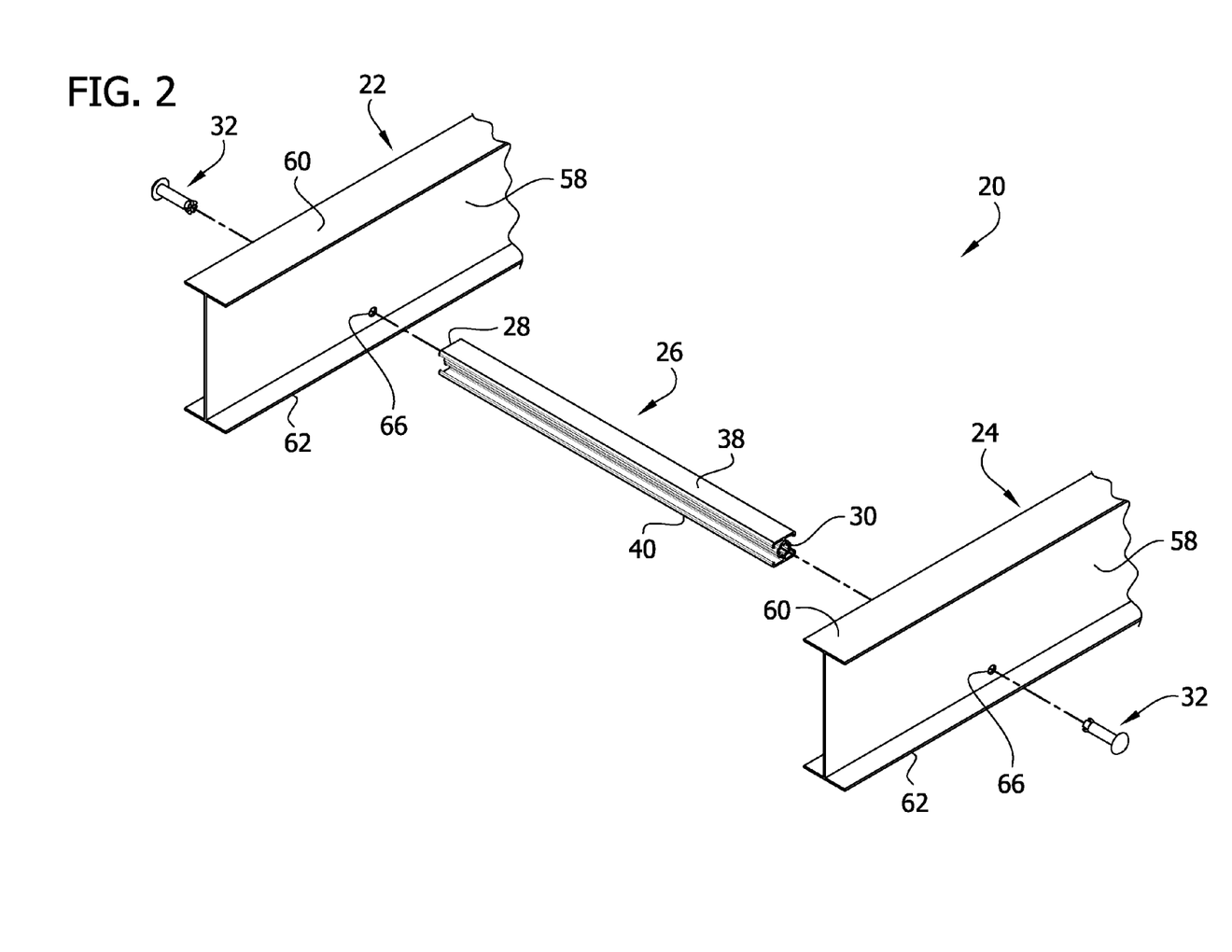
FIG. 2 is an enlarged exploded perspective view of the cable tray of FIG. 1.

Referring to FIGS. 2 and 3, the side rails 22, 24 are aluminum I-beams, preferably formed by extrusion. Each side rail 22, 24 is formed with a vertical web 58, upper and lower horizontal flanges 60, 62 extending laterally from the web on opposite sides of the web. Each side rail 22, 24 has a plurality of holes 66 (FIGS. 2, 5 and 7) through its web 58. The holes 66 are located generally adjacent the lower flange 62 of the rail and at intervals spaced along the rail. The holes 66 through the webs 58 of the rails align with the fastener openings 48 in opposite ends of the rungs when the rungs are positioned with their ends between the rails. The fasteners 32 extend through the holes 66 in the rails 22, 24 and into the fastener openings 48, as explained above, to secure the rung 26 to the rails. The diameter of each rail hole 66 (FIGS. 5 and 7) is greater than the non-expanded diameter of the radially expandable portion 57 and the fastener shaft 32b so that the radially expandable portion and the fastener shaft clear the rail hole during insertion of the fastener. Since the radially expandable portion 57 does not frictionally engage the corresponding rail 22, 24, the shaft 32b of the fastener 32 is tensioned between the head 32a of the fastener and the rung structure 46 when the fastener 32 is radially expanded within the fastener opening 48 to firmly hold the rung 26 against the web 58 of the rail.

Although each side rail 22, 24 is preferably I-shaped in transverse cross section, it is to be understood that, alternatively, the rails may be C-shaped or Z-shaped in transverse cross section, or have other suitable cross-sectional shapes. Also, although the rails 22, 24 and the rungs 26 are preferably of extruded aluminum, the rails and rungs may be formed of other metals or alloys or formed by other methods without departing from the scope of this invention.

To assemble the cable tray 20, the first end 28 of each rung 26 is placed against the inside face of the web 58 of the first rail 22 in a position resting on the lower flange 62, and the second end 30 of each rung 26 is placed against the inside face of the web 58 of the second rail 24 in a position resting on the lower flange 60. Each rung 26 is oriented relative to the rails 22, 24 such that the flanges of the rungs and rails lie in planes generally parallel to one another. In other words, the lower face 68 of the lower flange 40 of each rung 26 opposes the lower flanges 62 of the side rails 22, 24. When the rungs 26 and rails 22, 24 are in proper position with respect to one another, i.e., when the fastener openings 48 in the rungs 26 are aligned with the corresponding holes 66 through the webs 58 of the rails, the fasteners 32 are inserted through the holes 66 and into the fastener openings 48 in the rungs. In one example, the each fastener 32 is inserted into the corresponding fastener opening 48 when the respective radially expandable portion 57 is in the non-expanded configuration. After inserting the fastener 32 into the corresponding fastener opening 48, the radially expandable portion 57 is radially expanded (e.g., by a suitable rivet installation tool) such that the radially expandable portion engages the projections 54 and deforms into the gaps 55 to firmly secure the fastener in the fastener opening and inhibit withdrawal of the fastener from the fastener opening. With the fasteners 32 secured in the respective fastener openings 48, the rungs 26 are secured against the rails 22, 24. Since each rung 26 is symmetrical about its central longitudinal vertical and horizontal planes and is uniformly shaped throughout its length, the first and second ends 28, 30 of the rung are identical and the upper and lower flanges 38, 40 of the rung are identical. Thus, the orientation of the rung 26 relative to the rails 22, 24 is the same regardless of which end of the rung is secured to which rail and regardless of which flange of the rung opposes the lower flanges 62 of the rails. Since the rungs 26 are easily oriented relative to the rails and quickly secured to the rails by fasteners 32, cable tray can be produced economically at high production rates. Moreover, because the cable tray 20 is assembled without the need for welding, noxious fumes, inconsistent weld joints and other problems associated with welding are eliminated.

Having described embodiments of the invention in detail, it will be apparent that modifications and variations are possible without departing from the scope of the invention defined in the appended claims.

EXAMPLES

The following non-limiting example is provided to further illustrate the embodiments of the present invention.

A test was performed to determine the pull-out force needed to withdrawal a radially expandable fastener from a fastener opening in a rung constructed according to the teachings of the present disclosure. The radially expandable fastener used in the test was a drive-style blind rivet (i.e., a drive rivet) similar to the fastener 32 illustrated in FIG. 9. In particular, the drive-style blind rivet was a 0.25 in×1 in (6.35 mm×2.54 cm) aluminum drive pin rivet with a 5/32 in (3.97 mm) brazier-head drive pin (available from Fast-Rite International). The rung used in the test was an extruded aluminum rung having a fastener opening similar to fastener opening 48 illustrated in FIG. 8. The fastener opening included seven (7) projections arranged as shown in FIG. 8 and described above. The fastener opening was formed using a waterjet.

The drive rivet was placed through a clevis and into the fastener opening of the rung. An INSTRON® machine was used to apply a compressive load directly to a mandrel of the drive rivet to expand the radially expandable portion of the rivet. The compressive load was applied until the mandrel was flush with the rivet head. Peak load during this step was recorded as the "install load."

After expanding the radially expandable portion of the rivet, a tensile load was applied to the clevis via the INSTRON® machine in order to pull the expanded rivet out of the fastener opening. Any initial drops in applied load were recorded as the "slip load," and a peak load was recorded to determine the maximum resistance to removal.

The test was run 3 times using the different rungs of the same type and different rivets of the same type. Table 1 (below) shows the results of the 3 runs.

| Specimen | Install Load (lbf) | Slip load (lbf) | Peak pull (lbf) |
| --- | --- | --- | --- |
| 7 pt. Pattern - 1 | 862 | 162.5 | 491 |
| 7 pt. Pattern - 2 | 887 | 184 | 463 |
| 7 pt. Pattern - 3 | 895 | — | 464 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray comprising:
a pair of generally parallel spaced-apart side rails;
rungs extending between the rails at intervals spaced along the rails, wherein each metal rung has opposite ends generally abutting respective side rails, and a pair of fastener openings extending inward from opposite ends of the rung lengthwise of the rung, wherein each fastener opening is defined by an interior surface of the corresponding rung and at least one projection extending radially inward from the interior surface relative to the fastener opening; and
a plurality of radially expandable fasteners fastening the rungs to the side rails, each radially expandable fastener having a radially expandable portion received in one of the fastener openings of one of the rungs, wherein each radially expandable portion is in an expanded configuration and frictionally engages the projection of the corresponding rung inside the corresponding fastener opening to inhibit withdrawal of the radially expandable fastener from the fastener opening,
wherein the expanded radially expandable portion is deformed at least partially around the at least one projection.

2. The cable tray set forth in claim 1, wherein the at least one projection comprises a plurality of projections spaced apart from one another around a perimeter of the corresponding fastener opening to define a plurality of internal gaps between adjacent projections.

3. The cable tray set forth in claim 2, wherein a portion of the expanded radially expandable portion extends into one or more of the internal gaps.

4. The cable tray set forth in claim 3, wherein the projections extend along a length of the corresponding rung.

5. The cable tray set forth in claim 1, wherein each fastener comprises a blind rivet.

6. The cable tray set forth in claim 5, wherein the blind rivet is a drive rivet.

7. The cable tray set forth in claim 1, wherein the expanded radially expandable portion of each fastener has an indentation hardness less than an indentation hardness of a portion of the corresponding rung frictionally engaging the radially expandable portion.

8. The cable tray set forth in claim 1, wherein each rung includes a rung structure defining the fastener openings, the rung structure having an exterior surface and a plurality of indentations formed on the exterior surface, wherein the indentations inhibit radial expansion of the rung structure due to expansion of the radially expandable portions in the fastener openings.

9. A cable tray comprising:
a pair of generally parallel spaced-apart side rails;
rungs extending between the rails at intervals spaced along the rails, wherein each metal rung has opposite ends generally abutting respective side rails, and a pair of fastener openings extending inward from opposite ends of the rung lengthwise of the rung, wherein each fastener opening is defined by an interior surface of the corresponding rung and at least one projection extending radially inward from the interior surface relative to the fastener opening; and
a plurality fasteners fastening the rungs to the side rails, each fastener having an engagement portion received in one of the fastener openings, wherein each engagement portion frictionally engages the corresponding at least one projection inside the corresponding fastener opening to inhibit withdrawal of the radially expandable fastener from the corresponding fastener opening,
wherein the engagement portion of each fastener is deformed at least partially around the at least one projection.

10. The cable tray set forth in claim 9, wherein the at least one projection comprises a plurality of projections spaced apart from one another around a perimeter of the corresponding fastener opening to define a plurality of internal gaps between adjacent projections.

11. The cable tray set forth in claim 10, wherein a portion of the engagement portion extends into one or more of the internal gaps.

12. The cable tray set forth in claim 9, wherein each fastener comprises an expanded radially expandable fastener.

13. A cable tray comprising:
a pair of generally parallel spaced-apart side rails;
rungs extending between the rails at intervals spaced along the rails, wherein each metal rung has opposite ends generally abutting respective side rails, and a pair of fastener openings extending inward from opposite ends of the rung lengthwise of the rung, wherein each fastener opening is defined by an interior surface of the corresponding rung and at least one projection extending radially inward from the interior surface relative to the fastener opening; and
a plurality of radially expandable fasteners fastening the rungs to the side rails, each radially expandable fastener having a radially expandable portion received in one of the fastener openings of one of the rungs, wherein each radially expandable portion is in an expanded configuration and frictionally engages the projection of the corresponding rung inside the corresponding fastener opening to inhibit withdrawal of the radially expandable fastener from the fastener opening,
wherein each rung includes a rung structure defining the fastener openings, the rung structure having an exterior surface and a plurality of indentations formed on the exterior surface, wherein the indentations inhibit radial expansion of the rung structure due to expansion of the radially expandable portions in the fastener openings.

* * * * *